(12) United States Patent
Li et al.

(10) Patent No.: US 8,943,170 B2
(45) Date of Patent: Jan. 27, 2015

(54) CONTENT DELIVERY NETWORK AGGREGATION WITH SELECTED CONTENT DELIVERY

(75) Inventors: Ming Li, Beijing (CN); Philip Lin, Stateline, NV (US)

(73) Assignee: Ming Li, Beijing (CN)

( * ) Notice: Subject to any disclaimer, the term of this patent is extended or adjusted under 35 U.S.C. 154(b) by 177 days.

(21) Appl. No.: 13/178,828

(22) Filed: Jul. 8, 2011

(65) Prior Publication Data

US 2013/0013764 A1 Jan. 10, 2013

(51) Int. Cl.
| | |
|---|---|
| G06F 15/16 | (2006.01) |
| G06F 15/173 | (2006.01) |
| H04L 29/08 | (2006.01) |
| H04N 21/24 | (2011.01) |
| H04N 21/462 | (2011.01) |
| H04N 21/647 | (2011.01) |
| H04L 29/12 | (2006.01) |

(52) U.S. Cl.
CPC ............ *H04L 67/101* (2013.01); *H04L 67/322* (2013.01); *H04N 21/2402* (2013.01); *H04N 21/4622* (2013.01); *H04N 21/64723* (2013.01); *H04L 61/1511* (2013.01)
USPC ........... 709/219; 709/217; 709/218; 709/225; 709/238; 709/244

(58) Field of Classification Search
USPC ......... 709/238, 239, 240, 241, 242, 243, 244, 709/224, 219, 223, 203, 217, 218, 225; 370/235, 351, 392; 705/1.1
See application file for complete search history.

(56) References Cited

U.S. PATENT DOCUMENTS

| | | | |
|---|---|---|---|
| 2003/0174648 A1* | 9/2003 | Wang et al. .................... | 370/235 |
| 2003/0217129 A1* | 11/2003 | Knittel et al. .................. | 709/223 |
| 2005/0010653 A1* | 1/2005 | McCanne ...................... | 709/219 |
| 2006/0020684 A1* | 1/2006 | Mukherjee et al. ............ | 709/219 |
| 2006/0029038 A1* | 2/2006 | Jungck ........................... | 370/351 |
| 2006/0112176 A1* | 5/2006 | Liu et al. ........................ | 709/223 |
| 2009/0262741 A1* | 10/2009 | Jungck et al. ................. | 370/392 |
| 2009/0327489 A1* | 12/2009 | Swildens et al. .............. | 709/224 |
| 2010/0161760 A1* | 6/2010 | Maloo ............................ | 709/219 |
| 2010/0185455 A1* | 7/2010 | Miller ............................ | 705/1.1 |
| 2010/0332595 A1* | 12/2010 | Fullagar et al. ............... | 709/203 |
| 2011/0078230 A1* | 3/2011 | Sepulveda ..................... | 709/203 |
| 2012/0239725 A1* | 9/2012 | Hartrick et al. ............... | 709/203 |

* cited by examiner

*Primary Examiner* — Le H Luu

(57) ABSTRACT

A content delivery network (CDN) aggregation system is disclosed. A user requesting content from a content provider has his or her DNS request forwarded to a CDN selector. The CDN selector intelligently selects an optimal CDN from amongst a number of partner CDNs to provide the requested content.

15 Claims, 5 Drawing Sheets

CONTENT DELIVERY NETWORK AGGREGATION WITH SELECTED CONTENT DELIVERY

BACKGROUND

1. Field of the Invention

Embodiments of the present invention generally relate to content delivery networks.

2. Description of the Related Art

Today, users can access the Internet to interact with various web sites that offer up-to-date news, reports, real-time information, games, business functions, social interfaces, search functions, telepresence, etc. Users can surf the web, download files, play games, watch streaming movies, listen to music, shop, trade stocks, take educational courses, communicate, etc. Behind all of the myriad options available over the Internet is an evolving, rapidly growing, enormous amount of content and information in the form of text, graphics, audio, video, multi-media, data, web objects, applications, real-time streams, and other content capable of internet delivery.

All of this content is typically stored on servers, which are basically powerful computers that are specially designed to store and provide or "serve" the requested content to the end users. In its infancy, the Internet was primarily limited to users accessing the particular server that contained the content of interest. Each and every user desiring that particular content, would necessarily have to request the content from the specific, dedicated server hosted by that particular content provider. This methodology proved to be flawed, in part, because users tend to be geographically dispersed. Users that are located closer to the server may receive the content relatively quickly. However, those users that are geographically remote or more distant from the server may have to wait a while for the content to be transmitted and routed through the Internet before reaching their computers. This increased latency is highly undesirable because users are forced to wait for a web page to load or for the content to be downloaded. Furthermore, simply coupling additional servers to a network backbone can cause that particular backbone to become saturated. In other words, a section of the Internet may have too much data being transmitted over it and thereby, acts as a bottleneck. Again, delivery of content is slowed down as a result.

In an effort to improve content deliver performance, content providers have implemented their own content delivery networks or content distribution networks (CDNs). Basically, a content delivery network is a group of computers and/or servers networked together via the Internet that cooperate amongst themselves to transparently deliver the content to various users in a more expeditious manner. One of the keys to CDNs is the use of strategically placed edge servers (also known as POP servers, ghost servers, cache servers, web servers, or any combination of hardware or software designed to provide services to client computers). These edge servers are typically located to provide improved geographical coverage corresponding to the end users. Hence, a user in one city (e.g., New York) may access an edge server closer to his or her location, whereas another user in a different city (e.g., Tokyo) may access an edge server closer to his or her location; and a user in another part of the world (e.g., Paris), may access a separate, different edge server which is situated in a nearby location.

In general, the CDN design of placing edge servers closer to end users means that the data packets do not have to be transmitted as far. In addition to distance, there may be other factors to consider, such as load conditions, server capacities, network bandwidths, etc., when selecting the most expeditious server for each individual user. The end result yields improvements in both latency and packet loss. From the users' perspective, they will experience faster and higher quality access to their requested content. Furthermore, if one edge server happens to malfunction, other edge servers can take over and service the requests. All of these benefits conferred by a CDN are of critical importance to the success of a content provider because users are more apt to visit their site if the content is faster, and richer, and more reliable. Increased Internet traffic to a site directly translates to more advertisement revenues.

Unfortunately, CDNs are rather expensive to install, upgrade, and maintain. The computing and network hardware can be quite expensive to purchase. It takes expert knowledge to build a CDN and also to upgrade an existing CDN. Furthermore, running, servicing, troubleshooting, and load-balancing a CDN can be quite daunting. In addition, CDNs can be notoriously inefficient. For example, a CDN for supporting a financial institution or governmental agency may be busy only during work hours; the same CDN would be grossly under-utilized at night, holidays, and weekends. Yet another downside inherent to CDNs is that it takes a relatively lengthy time to deploy a CDN. These days, content providers want to be first-to-market in order to capture a particular audience or user profile.

Although CDNs resolve some of the more immediate needs of content providers, the CDN concept still falls short in many areas.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

Embodiments of the present disclosure pertain to an apparatus and method for aggregating CDNs. DNS requests from users are forwarded to a CDN aggregator. The CDN aggregator intelligently selects an optimal CDN from a number of partner CDNs for servicing these requests. The selected CDNs then provide the content to the respective users. In this manner, CDNs are selected for optimal usage.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
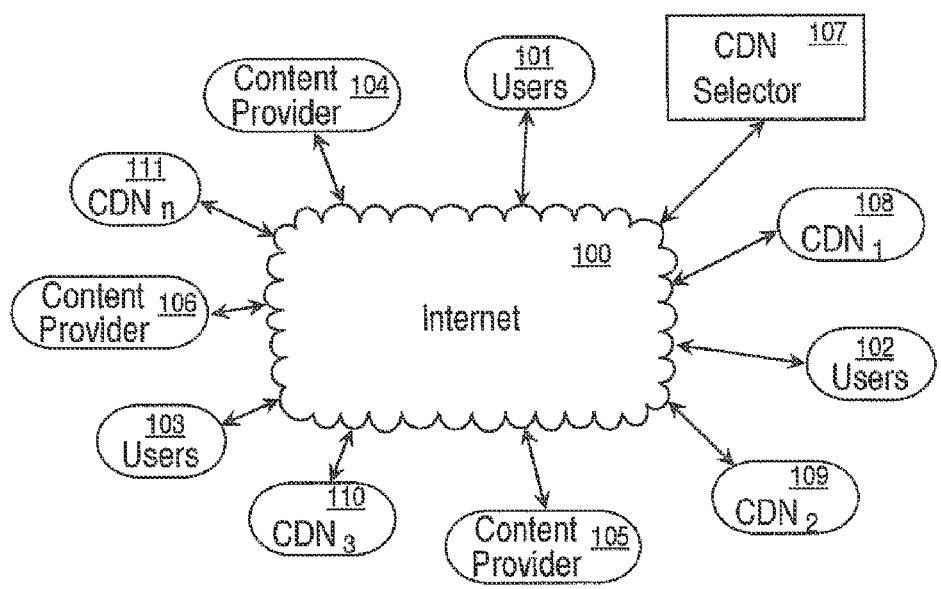
FIG. 1 shows a diagram of a CDN aggregator system.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

The present invention pertains to a content delivery/distribution network (CDN) aggregator. In general, a number of hitherto disparate CDNs agree to form and be part of an affiliated network. The operator/owners of the CDNs that agree to participate in this network, will allow their network resources, such as their POP/edge servers and Domain Name Servers (DNS's), to be used by approved outside content providers. Under the CDN aggregator system, whenever an approved content provider receives a request for specific content by a user, the request is intelligently steered to be serviced by the best available CDN.

Consequently, a content provider is not limited to installing, configuring, running, and maintaining their own dedicated CDN. A content provider can now simply pay a fee to became an approved member and avail itself of the immense resources conferred by a CDN aggregator system. By taking advantage of an already existing CDN aggregator system, a content provider can be up and running very quickly; time-to-market is drastically shortened. Furthermore, content providers can now focus on their main core business of generating more and better content to increase traffic and revenue, rather than being distracted with the task of overseeing a CDN. It may very well turn out that for the majority of content providers, the CDN aggregator system proves to be the most cost-efficient and highest quality option.

Moreover, from the standpoint of the operator/owners of CDNs, it may be beneficial to join a CDN aggregator system because they could then avail themselves of the resources conferred by the other partner CDNs. For example, a partner CDN could have POP or edge servers that are located closer to a particular group of users. Alternatively, a partner CDN could be faster due to network bandwidth and/or load constraints. Furthermore, partner CDNs could share in the revenue stream of paying content providers. This is especially profitable if a CDN finds itself with excess capacity. They can now sell their excess capacity. Therefore, these and other advantages render the CDN aggregator system vastly superior to the single, isolated CDNs present today.

Referring now to FIG. 1, a diagram of a CDN aggregator system is shown. Any number of users 101-103 situated in any number of locations, are interacting with any number of content providers 104-106 via the Internet 100. These content providers can be web sites that supply different types of online information (e.g., news, entertainment, weather reports, traffic conditions, job listings, financial data, etc.). The content providers can also offer online distribution of copyrighted materials (e.g., games, music, video, e-books, television broadcasts, etc.). The content providers can also be commercial sites (e.g., on-line merchants, social networking sites, auction sites, search engines, etc.). If a content provider is part of the CDN aggregator system, it directs its users' requests to the CDN selector 107. For each of these forwarded individual requests, the CDN selector 107 selects an optimal CDN from the group of CDNs, such as CDN 108-110, of the CDN aggregator system to service that particular request. The request is then forwarded to the selected CDN. In one embodiment, the CDN selector 107 contains software and information that is used to intelligently select the optimal CDN. The selection process can be accomplished heuristically, rule-based, adaptively, or algorithmically. The present invention encompasses all of the many, different ways by which a CDN can be selected. Once a CDN has been selected, the request is forwarded to that particular CDN. The requested content is then served back to the original user via the Internet 100 for display and/or download.

An example is now offered to describe the operation of a CDN aggregator system. Suppose that a user in location or group 101 visits a web site hosted by content provider 105. The user's request to access the web site is forwarded by content provider 105, via Internet 100, to the CDN selector 107. Assuming that CDN 108 is the most optimal CDN to handle this request, CDN selector 107 makes this determination and forwards this request to CDN 108. Thereupon, CDN 108 follows standard operating procedures and determines which of its servers is to host this request. This is typically handled by the CDN's domain name server (DNS). If the requested content is already cached in a particular server, the content is transmitted to the user via Internet 100. Otherwise, the content is requested from the content provider 105, stored in the local memory of a server within CDN 108, and subsequently provided to the user.

Next, suppose a different user, belonging to location or group 102 visits that same web site hosed by content provider 105. This second user's request is, likewise, forwarded via Internet 100 to the CDN selector 107 by the content provider 105. Due to a variety of different factors (e.g., different geographical location, different time, different quality-of-service or privilege, hardware constraints, etc.), suppose that CDN 110 is the most optimal CDN from the group of available CDNs, to handle this request from the second user. CDN selector 107 performs its function and correctly identifies that CDN 110 is the most optimal CDN. The request from the second user is now forwarded to CDN 110. CDN 110 follows standard operating procedures and transmits the associated content to the second user.

Figure 2:
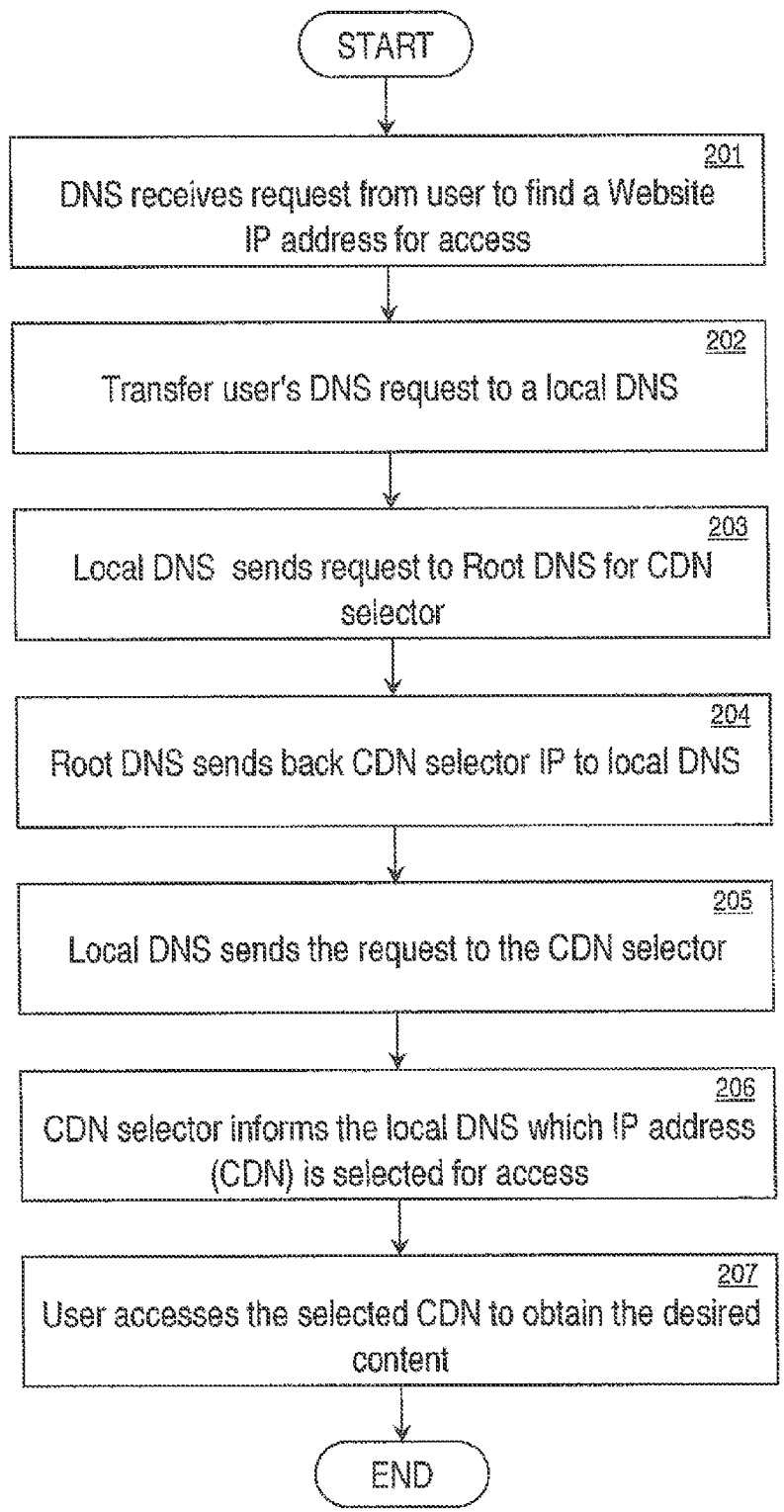
FIG. 2 shows a flowchart describing a CDN aggregator process according to one embodiment of the present invention.

FIG. 2 is a flowchart describing a CDN aggregator process according to one embodiment of the present invention. Initially, when a user clicks on a website link or enters in a URL into his or her web browser, the DNS receives the request from the user to find the website's IP address for access, step 201. The user's DNS request is transferred to a local DNS for handling, step 202. The local DNS sends request to Root DNS for CDN selector, step 203. The Root DNS sends back CDN selector IP to local DNS, step 204. The local DNS sends the request to the CDN selector, step 205. The CDN selector informs the local DNS which IP address (CDN) is selected for access, step 206. The user accesses the selected CDN to obtain the desired content, step 207.

Figure 3:
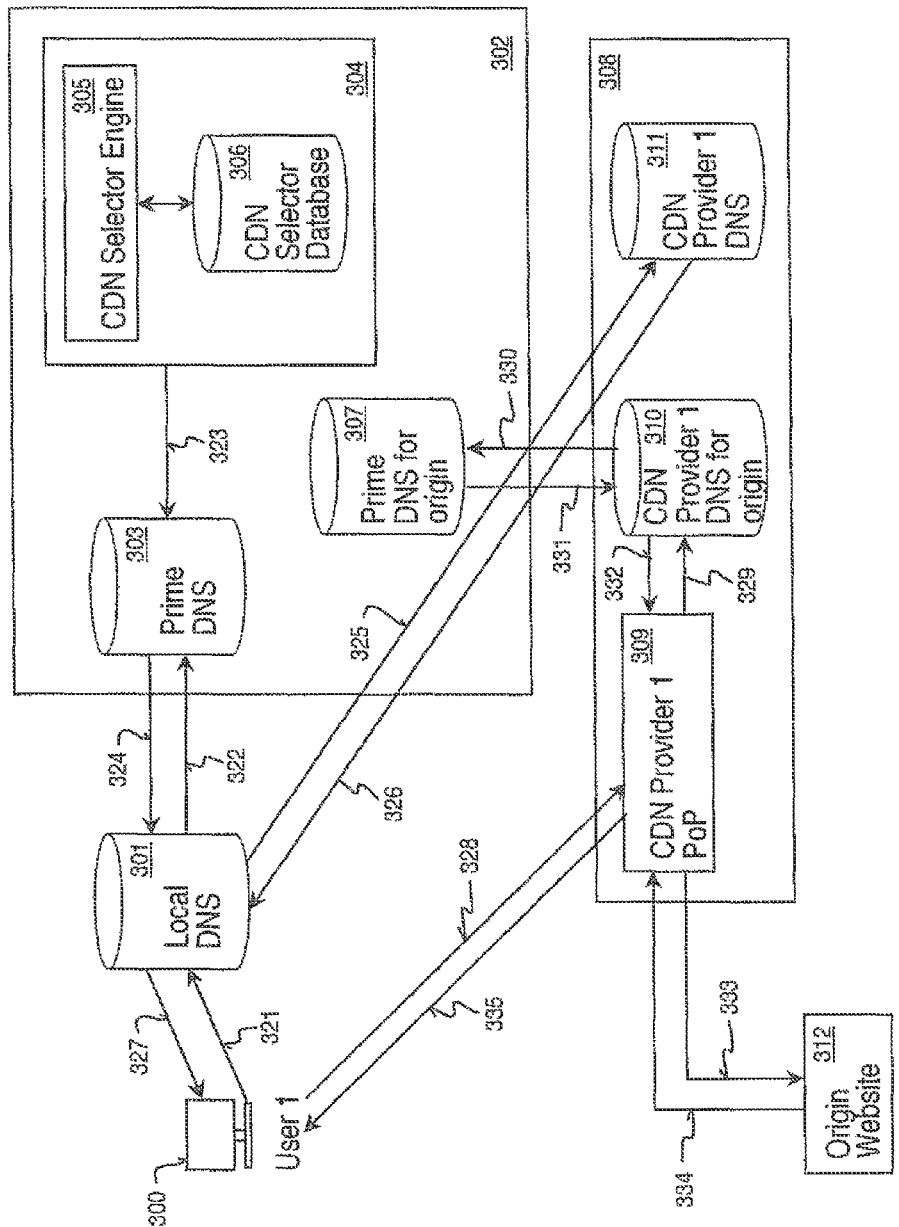
FIG. 3 shows an exemplary CDN aggregator system.

FIG. 3 shows an exemplary system that employs the use of a CDN aggregator. In this system, a user (e.g., user1) working on a personal computer, laptop, mobile browsing device, or any other client device 300, initiates an access to web content from an origin website 312. This is accomplished by the client computer 300 sending a DNS request 321 to a local DNS server 301 for the IP address of the origin website 312. An IP address is a numerical label assigned to devices according to the Internet Protocol. The local DNS server 301 checks its cache memory to find the requested IP address. If there is no match, the local DNS server 301 sends a request 322 to the CDN aggregator 302. CDN aggregator 302 is comprised of Prime DNS server 303, CDN selector 304, and Prime DNS for origin server 307. The CDN aggregator can be assigned any cname. In this example, the cname is called "Prime." The request 322 is received by the Prime DNS server 303. A CDN selector 304 is used to select an appropriate CDN. The CDN selector 304 is comprised of CDN selector engine 305 and CDN selector database 306. Selector engine 305 is comprised of hardware (e.g., one or more microprocessors, application specific integrated circuits, memory devices, interfaces, etc.) running software that determines which one of the CDNs that are part of the CDN aggregator system that would be most optimal to service the request. The software considers information from multiple sources in selecting what is considered to be the most optimal CDN. Some information that may be useful include, but is not limited to, data found in the incoming IP packet (e.g., Source IP Address, Destination IP Address, Type of Service, Time to Live, Options, etc.). In addition, other data, such as data from network/traffic management systems; time of day; DNS coverage; real time logs; cost; ping time; network prediction models; feedback information; etc., can be used in the selection process. The selection process can take all or a combination of the data and apply an algorithm, set of rules, etc. to automatically select what is considered to be the most optimal CDN for handling that particular request. The CDN selection process is described in detail in U.S. patent application Ser. No. 13/179,155, entitled, "CONTENT DELIVERY PREDICTION AND FEEDBACK SYSTEMS" filed on Jul. 8, 2011, which is incorporated by reference in its entirety herewith. A CDN selector database 306 containing the domain names and/or IP addresses of the DNS servers (e.g., DNS servers 307, 320, and 321) of all the partner CDNs (e.g., CDNs 304-306) is coupled to the CDN selector engine 305. The domain name or IP address of the DNS server of the selected CDN is supplied by the database 306. In this example, provider1's CDN network 308 is selected as being the most optimal CDN. The CDN selector 305 selects and loads 323 the CDN provider1's cname to the Prime DNS server 303. The Prime DNS server 303 sends a response 324 to the local DNS server 301 with the cname.

Thereupon, the local DNS server 301 sends a request 325 to provider1's CDN network 308. Provider1's CDN network 308 is comprised of CDN provider1's DNS server 311, CDN provider1's DNS for origin server 310, and one or more of CDN Provider1's PoP server(s) 309. The request 325 is received by the CDN provider 1's DNS server 311. In response, the CDN provider1's DNS provides the IP address 326 corresponding to the CDN provider1's PoP server to the local DNS server 301. The local DNS server 301 forwards this IP address 327 to the client device 300. The aforementioned flows 321-327 are all DNS accesses. The next process is an HTTP request 328 that is sent by the client device 300 to the CDN provider1's PoP server 309. Upon receiving this request, the CDN provider1's PoP server 309 sends a DNS request 329 to the CDN provider1's DNS for origin server 310 in order to determine the IP address of the origin website 312. If there is no preconfigured origin website IP address stored in the CDN provider1's DNS for origin server 310, a DNS request 330 is sent to the Prime DNS for origin server 307. The Prime DNS for origin server 307 responds by transmitting the origin website's IP address 331 to the CDN provider1's DNS for origin server 310. The CDN provider1's DNS for origin server 301 forwards the origin website's IP address 332 to the CDN provider1's PoP server 309. It should be noted that the aforementioned flows 329-332 are all DNS accesses. Furthermore, flows 329-332 are but one of several different approaches to obtain the IP address of the origin website 312. Other approaches include, but are not limited to: preconfiguring it in the CDN provider1's origin DNS; obtaining the IP address from the Prime CDN aggregator 302 via an API; and preconfiguring the CDN provider1's PoP with the origin website IP address.

Once the CDN provider1's PoP server 309 receives the IP address of the origin website, it transmits an HTTP request 333 to the origin website 312. The origin website 312 responds to this HTTP request by providing the requested content 334 it is hosting to the CDN provider1's POP server 309. The CDN provider1's POP server 309 caches this content and transmits the content 335 to the client device 300. User1 now has access to view, listen, and/or interact with this content.

Figure 4:
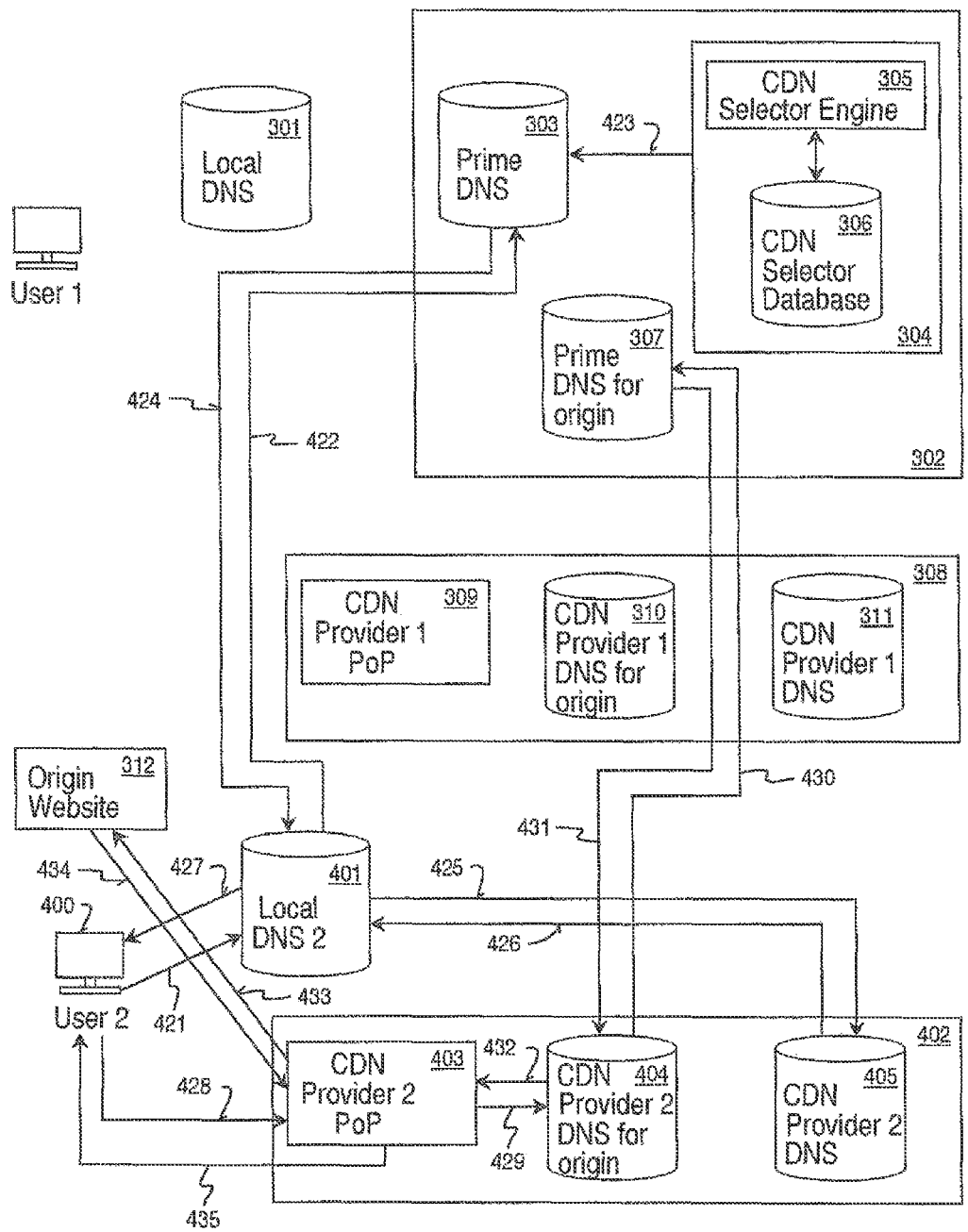
FIG. 4 shows how the CDN aggregator system handles DNS requests from a plurality of different users.

Now suppose a different user wishes to access the same origin website 312. FIG. 4 shows how the CDN aggregator system handles the request from a different user. If this second user (e.g., user2) is at a different location than that of the first user (e.g., user1), the CDN selector 304 takes this difference into consideration when making its selection. The CDN selector 304 could select a different, more optimal CDN network (e.g., provider2's CDN network 402) for the second user. More specifically, the process would entail user2 working on client device 400 initiating an access to web content hosted by the origin website 312. This is accomplished by the client computer 400 sending a DNS request 421 to a local DNS2 server 401 for the IP address of the origin website 312. The local DNS2 server 401 checks its cache memory to find the requested IP address. If there is no match, the local DNS2 server 401 sends a request 422 to the CDN aggregator 302. The request 422 is received by the Prime DNS server 303. CDN selector 304 is used to select an appropriate CDN for user2's request. In this example, it is supposed that provider2's CDN network 308 is selected as being the most optimal CDN. The CDN selector 305 selects and loads 323 the CDN provider2's cname to the Prime DNS server 303. The Prime DNS server 303 sends a response 424 to the local DNS2 server 401 with the cname corresponding to CDN provider2.

The local DNS2 server 401 sends a request 425 to provider2's CDN network 402. Provider2's CDN network 402 is comprised of CDN provider2's DNS server 405, CDN provider2's DNS for origin server 404, and one or more of CDN Provider2's PoP server(s) 403. The request 425 is received by the CDN provider 2's DNS server 405. In response, the CDN provider2's DNS server 405 provides the IP address 426 corresponding to the CDN provider2's PoP server to the local DNS2 server 401. The local DNS2 server 401 forwards this IP address 427 to the client device 400. The aforementioned flows 421-427 are all DNS accesses. The next process is an HTTP request 428 that is sent by the client device 400 to the CDN provider2's PoP server 403. Upon receiving this request, the CDN provider2's PoP server 403 sends a DNS request 429 to the CDN provider2's DNS for origin server 404 in order to determine the IP address of the origin website 312. If there is no preconfigured origin website IP address stored in the CDN provider2's DNS for origin server 404, a DNS request 430 is sent to the Prime DNS for origin server 307. The Prime DNS for origin server 307 responds by transmitting the origin website's IP address 431 to the CDN provider2's DNS for origin server 404. The CDN provider2's DNS for origin server 404 forwards the origin website's IP address 432 to the CDN provider2's PoP server 403. The aforementioned flows 429-432 are all DNS accesses.

Once the CDN provider2's PoP server 403 receives the IP address of the origin website, it transmits an HTTP request 433 to the origin website 312. The origin website 312 responds to this HTTP request by providing the requested content 434 to the CDN provider2's POP server 403. The CDN provider2's POP server 403 caches this content and transmits the content 435 to the client device 400. User2 now has access to view, listen, and/or interact with this content.

It is clearly demonstrated and described above that the CDN aggregator system intelligently directs network traffic to the best possible CDN. User1 obtains the content by means of CDN network 308, whereas user2 obtains the same content through a different provider's CDN network 402. Consequently, end users will likely experience less jitter, fewer network peaks and surges, and improved content delivery. End users will also benefit from increased reliability because the CDN selector can redirect traffic from broken or malfunctioning servers to servers that are operational. Other benefits of implementing a CDN selector include lower costs and a more balanced network load by dynamically distributing network resources to meet changing demands.

Figure 5:
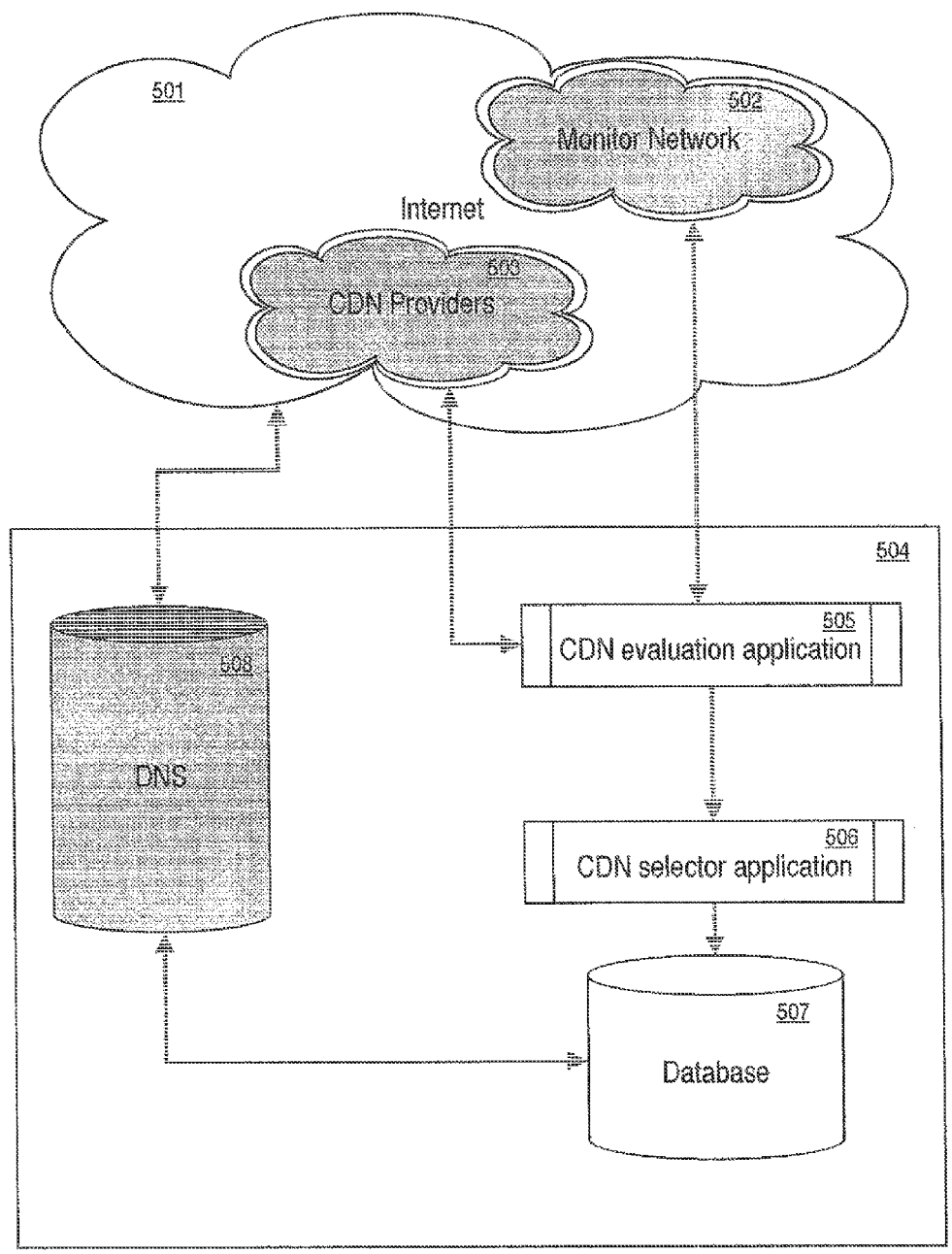
FIG. 5 shows an exemplary diagram of a CDN selector system.

FIG. 5 shows an exemplary diagram of a CDN selector system 504. The CDN selector 504 is comprised of a multi-server and sub-system combination running customized selection software. The CDN selector 504 includes one or more DNS servers 508, a CDN evaluation application 505, a CDN selector application 506, and a database 507. The CDN evaluation application 505 evaluates the various partner CDN providers 503 accessible via Internet 501. Part of this evaluation process can take into account information provided by a monitor network 502, which provides real-time and historic data pertaining to Internet traffic conditions. Network feedback information from third party monitoring systems 502 and/or real-time traffic logs can be used to adjust the predictions by the CDN selector application 506. This enables the CDN selector application 506 to adapt to changing network conditions. The CDN selector application 506 calculates a value that is used as an indicator of an optimal CDN. The CDN selector application 506 can also take into consideration the distances to the respective CDNs in terms of number of hops. Closer CDNs are favored over more distant CDNs. This value can be a function of the packet (e.g., UDP, ping time, HTTP, FTP, etc.). Other variables that may also be considered by the CDN selection application 506 include cost, a threshold in terms of lower and/or upper bandwidths, time of day, DNS coverage, etc. One or more functions are defined as to which criteria to consider and their respective relevancies. For example, cost may be of more significance to one content provider but not to some other content provider. Consequently, the selection function for the first content provider would weight the cost variable more heavily when determining which CDN is to be selected. Furthermore, the CDN selector application 506 can customize the selection function to that of different content providers. The CDN selector application stores its results in a database 507. This information is used by DNS servers 508 to direct requests to the appropriate CDN providers 503.

Thus, a CDN aggregation system has now been disclosed. Although illustrative embodiments of the invention have been described in detail herein with reference to the accompanying figures, it is to be understood that the invention is not limited to those precise embodiment. The invention is not limited to CDN's, but rather, encompasses a wide range of networks and network configurations. Furthermore, the embodiments described above are not intended to be exhaustive or to limit the invention to the precise forms disclosed. As such, many modifications and variations will be apparent. Accordingly, it is intended that the scope of the invention be defined by the following Claims and their equivalents.

What is claimed is:

1. A content delivery network aggregator system, the system comprising:
    a content delivery network evaluator operable to evaluate each of a plurality of unrelated content delivery networks, wherein each content delivery network of the plurality of unrelated content delivery networks comprises a separate plurality of content servers, wherein each content server is an edge server providing services; and
    a content delivery network selector operable to select, based upon an evaluation from the content delivery network evaluator, one of the plurality of unrelated content delivery networks to provide content to a first user and further operable to select a different content delivery network to provide the same content to a second user, and wherein two or more content delivery networks of the plurality of unrelated content delivery networks supply different types of content, wherein said evaluation is based on a network prediction model, wherein said content delivery network selector is operable to communicate an identifier associated with said selected content delivery network to a DNS server.

2. The content delivery network aggregator system of claim 1 further comprising a monitor coupled to the content delivery network evaluator that monitors real-time Internet conditions which are used in evaluating the plurality of unrelated content delivery networks.

3. The content delivery network aggregator system of claim 1, wherein the content delivery network selector selects a particular content delivery network according to a plurality of factors corresponding to a the plurality of unrelated content delivery networks.

4. The content delivery network aggregator system of claim 1, wherein the content delivery network selector selects the particular content delivery network according to distance information.

5. The content delivery network aggregator system of claim 1, wherein each of the plurality of unrelated content delivery networks comprise a domain name server and a plurality of POP servers.

6. A method for providing content through a network comprising:
    receiving a DNS request from a local DNS server;
    selecting an IP address corresponding to a particular content delivery network from a plurality of unrelated content delivery networks based on a network prediction model, wherein each content delivery network of the plurality of unrelated content delivery networks comprises a separate plurality of content servers, wherein each content server is an edge server providing services, and wherein two or more content delivery networks of the plurality of unrelated content delivery networks supply different types of content;
    forwarding the IP address to the local DNS server.

7. The method of claim 6 further comprising:
    receiving a second DNS request from a second local DNS server;
    selecting an IP address corresponding to a second content delivery network from the plurality of unrelated content delivery networks;
    forwarding the IP address corresponding to the second content delivery network to the second DNS server, wherein content hosted by a website is provided to two different users through two different content delivery networks.

8. The method of claim 7 further comprising applying an intelligent selection process to select an optimal content delivery network from the plurality of unrelated content delivery networks.

9. The method of claim 6, wherein the IP address forwarded to the local DNS server corresponds to a DNS server of the particular content delivery network that was selected.

10. The method of claim 6 further comprising storing IP addresses corresponding to domain name servers corresponding to the plurality of unrelated content delivery networks.

11. A content delivery network aggregation system comprising:
   a plurality of unrelated partner content delivery networks for providing content, wherein each partner content delivery network of the plurality of unrelated partner content delivery networks comprises a separate plurality of content servers, wherein each content server is an edge server providing services, and wherein two or more content delivery networks of the plurality of unrelated partner content delivery networks supply different types of content;
   a content delivery network evaluator operable to evaluate each of the plurality of unrelated partner content delivery networks; and
   a content delivery network selector coupled to the plurality of unrelated partner content delivery networks, wherein the content delivery network selector determines which of the unrelated content delivery networks is to provide the content to specific users based upon an evaluation from the content delivery network evaluator, wherein said evaluation is based on a network prediction model, wherein said content delivery network selector is operable to communicate an identifier associated with said selected content delivery network to a DNS server.

12. The content delivery network aggregation system of claim 11, wherein the content delivery network selector intelligently determines as a function of a plurality of variables, which of the content delivery networks is to provide the content to specific users.

13. A method of aggregating a plurality of content delivery networks comprising:
   storing a plurality of IP addresses of a plurality of domain name servers corresponding to a plurality of unrelated content delivery networks, wherein each content delivery network of the plurality of unrelated content delivery networks comprises a separate plurality of content servers, wherein each content server is an edge server providing services, and wherein two or more content delivery networks of the plurality of unrelated content delivery networks supply different types of content;
   receiving a DNS request to determine an IP address of a website;
   forwarding an IP address from the plurality of IP addresses of a domain name server corresponding to a particular content delivery network selected from the plurality of unrelated content delivery networks, wherein said IP address is selected based on a network prediction model.

14. The method of claim 13 further comprising:
   forwarding a first IP address of a first domain server corresponding to a first content delivery network in response to a request from a first user;
   forwarding a second IP address of a second domain server corresponding to a second content delivery network in response to a request from a second user, wherein the requests from first user and the second user are to the same website.

15. The method of claim 13 further comprising:
   selecting different IP addresses corresponding to different domain name servers belonging to different content delivery networks for providing the same content to different users.

* * * * *